United States Patent [19]

Colleran et al.

[11] Patent Number: 5,011,426
[45] Date of Patent: Apr. 30, 1991

[54] ELECTRICAL CONNECTOR ASSEMBLY FOR VEHICULAR SUSPENSION SYSTEM COMPONENT

[75] Inventors: Stephen A. Colleran; Edward J. Plocek, both of Lisle; Timothy R. Ponn, Aurora; William D. Gruhn, Wheaton, all of Ill.

[73] Assignee: Molex Incorporated, Lisle, Ill.

[21] Appl. No.: 474,571

[22] Filed: Feb. 2, 1990

[51] Int. Cl.$^5$ .............................................. H01R 13/73
[52] U.S. Cl. .................................................... 439/357
[58] Field of Search ................. 439/350, 34, 353, 354, 439/355, 357, 358, 680, 681, 704, 705, 706, 707, 709, 733, 738, 752, 736, 660, 676, 682, 692, 693, 695, 699

[56] References Cited

U.S. PATENT DOCUMENTS

| | | | |
|---|---|---|---|
| 3,588,783 | 6/1971 | Newman | 439/598 |
| 3,747,048 | 7/1973 | Johnson et al. | 439/349 |
| 4,211,461 | 7/1980 | Wescott | 439/357 |
| 4,472,010 | 9/1984 | Parnello | 439/660 |
| 4,703,989 | 11/1987 | Price et al. | 439/676 |
| 4,789,343 | 12/1988 | Dougherty et al. | 439/34 |

Primary Examiner—David L. Pirlot
Assistant Examiner—Hien D. Vu
Attorney, Agent, or Firm—Louis A. Hecht; Stephen Z. Weiss; A. A. Tirva

[57] ABSTRACT

An electrical connector assembly is provided for a vehicular suspension system component. The connector assembly includes a male connector which is engageable in the suspension system component. The housing of the male connector includes polarization and antirotation lugs which are engageable with corresponding structures on the suspension system component. A female connector is engageable over the end of the suspension system component for electrical connection with the terminals of the male connector. The terminals of both connectors in the assembly are insert molded into the nonconductive housings. The locking engagement of the female connector on the suspension system component can be achieved with a metallic retention lever that biasingly engages an annular groove in the exterior of the suspension system component.

17 Claims, 4 Drawing Sheets

ELECTRICAL CONNECTOR ASSEMBLY FOR VEHICULAR SUSPENSION SYSTEM COMPONENT

BACKGROUND OF THE INVENTION

Vehicular suspension system components, such as shock absorbers and struts, include a plurality of members that are in sliding telescoped relationship to one another. The movement of these telescoping members relative to one another dampens shocks encountered as the vehicular wheels traverse a road. More particularly, the telescoping members of the suspension system component may be biased in a first direction relative to one another, and may move in an opposed direction in response to forces generated when the vehicular wheel encounters an irregularity in the roadway surface. The vehicular suspension system component typically will include a gas or liquid disposed therein and a plurality of chambers between which the fluid flows as the members of the suspension system component move in telescoped relationship to one another. The forces required to cause the telescoped movement of the members of the suspension system component are determined in part by the cross-sectional area of the flow control point between chambers of the component. Many suspension system components include adjustable valves to alter the responsiveness of the component to roadway irregularities.

The fairly recent prior art includes shock absorbers and struts with electrically operated valves and sensors disposed internally therein. These internal sensors and controls are operatively connectable to a microprocessor which interprets signals from the sensors and which controls the shock or strut to achieve optimum suspension for the sensed roadway conditions. In other instances, electronic dashboard controls will enable the driver to adjust the suspension from the driver's seat in response to existing or anticipated road surface conditions.

The electrical connections between the vehicular suspension system component and the onboard microprocessor or dashboard control is subjected to extreme environmental conditions. In particular, the electrical connection to the suspension system component is subjected to virtually continuous vibration during operation of the vehicle, wide ranges in temperature and direct exposure to moisture and corrosive materials. Additionally, cables leading to a suspension system component may be abruptly contacted by mechanics attempting to access nearby parts of the vehicle. Furthermore, the suspension system components often must be replaced or repaired or at least temporarily removed to enable repair or replacement of nearby parts of the vehicle. Such replacement of the vehicular suspension system component necessarily will require disconnection and subsequent reconnection of the electrical connector. As a result, in addition to performing well in a hostile environment, the electrical connectors for vehicular suspension system components must be easily connectable and disconnectable.

A prior art electrical connector for a vehicular suspension system component is shown in U.S. Pat. No. 4,789,343 which issued to Dougherty et al on Dec. 6, 1988. The connector shown in U.S. Pat. No. 4,789,343 includes a female connector which is engageable within an end of the suspension system component. The inner end of the female connector includes a strain relief component hingedly connected to the remainder of the female connector and rotatable into strain relief connection with the conductors extending longitudinally through the suspension system component. The strain relief member is held tightly against the conductors by the frictional interfit of the female connector within the end of the suspension system component. The terminals of the female connector extend generally longitudinally and are disposed in planes which are angularly aligned to one another. The male conductor includes a compatible array of terminals which are electrically connected to a cable which extends to control means in the vehicle. The male conductor also includes a hingedly connected cap which is rotatable into strain relief connection to the cable. The male connector includes unitarily molded plastic latches for selectively engaging flats on opposed lateral exterior sides of the suspension system component. A moisture boot is then engageable over the top of the male connector to provide the necessary moisture protection. The connector assembly shown in U.S. Pat. No. 4,789,343 is very complex and therefore difficult to assemble. Additionally, the formation of the flats on opposed lateral sides of the generally cylindrical suspension system components are difficult to manufacture. Furthermore, the various plastic hinged and locking structure shown in U.S. Pat. No. 4,789,343 would be difficult to manipulate in the field as part of any repair or replacement to the suspension system component. As a result, there is a significant likelihood that the suspension system component shown in U.S. Pat. No. 4,789,343 could be damaged by automotive mechanics performing routine repair or replacement in the vicinity of the suspension system component.

In view of the above, it is an object of the subject invention to provide an improved electrical connector for vehicular suspension system components.

It is another object of the subject invention to provide an electrical connector for suspension system components that is easy to connect and reconnect in the field and that is not readily subject to damage.

It is a further object of the subject invention to provide an electrical connector that can withstand the environmental extremes and vibration necessary for a vehicular environment.

Still another object of the subject invention is to provide an electrical connector for suspension system components that can be blind mated and unmated.

SUMMARY OF THE INVENTION

The subject invention is directed to an electrical connector assembly for a vehicular suspension system component, such as a shock absorber or strut. The assembly includes a first connector which may be slidably receivable in an end of the suspension system component, and which may comprise a generally cylindrical nonconductive housing. A plurality of electrically conductive terminals may be securely and rigidly mounted therein such that portions of each terminal may extend from the opposed longitudinal ends of the housing. The terminals of the first connector may be insert molded into the nonconductive housing, such that a unitary matrix of nonconductive material surrounds, precisely positions and supports portions of the various terminals in the first connector. One end of each terminal of the first connector is appropriately configured for electrical connection to conductors disposed in the suspension system component. The conductors may extend to an appropriate electronic valving means and/or appropriate sensing means for sensing roadway conditions. Thus, the first connector enables the receipt of signals indicative of roadway conditions, and/or the transmission of signals for adjusting the performance of the suspension system component in accordance with the sensed roadway conditions.

The first connector further includes polarizing and anti-rotation means for ensuring proper rotational orientation of the first connector in the end of the suspension system component. The polarization and antirotation means may define lugs extending laterally from the first connector in a nondiametrical alignment, such that only one rotational orientation of the first connector in the suspension system component is possible and such that rotation is positively prevented. The housing of the first connector may further include guide means for facilitating the mating of the first connector with a second connector as explained further herein.

The first connector may further include locking means for lockingly retaining the first connector within the end of the suspension system component. The locking means may prevent longitudinal movement of the first connector relative to the suspension component, to prevent damage to the fragile connections between the first connector and the conductors disposed within the suspension system component. The locking means may comprise a beveled washer, with the bevel being aligned to permit deflection of the washer upon insertion of the first connector into the suspension system component. However, the alignment of the deflection will cause the washer to bite into the inner surface of the suspension system component in response to a withdrawal force, thereby preventing separation of the first connector from the suspension system component.

The connector assembly further includes a second connector that is removably engageable with the suspension system component and with the first connector. The second connector includes a housing which may be molded from a nonconductive material. A plurality of terminals are disposed in the housing for electrical connection to the terminals of the first connector. The terminals of the second connector are respectively connected to conductors of a cable which extends from the housing of the second connector. The terminals and the portions of the cable conductors connected to the terminals may be insert molded into the housing of the second connector, such that the terminals and the conductors terminated thereto are surrounded and supported by a unitary matrix of nonconductive material. This insert molding provides desirable strain relief and moisture-proof protection for the important and fragile terminations within the second connector, and further protects and accurately positions the terminals.

The second connector may further comprise metallic spring retention means mounted therein for lockingly but releasably engaging a portion of the suspension system component or the first connector. For example, the suspension system component may include a generally annular undercut or groove formed therein which may be engageable by metallic spring retention means on the first connector. The metallic spring retention means may be permanently engaged in a slot of the second connector housing and may be biased into a locking position on the second connector housing. The metallic spring means may further include an actuating portion which is readily accessible on the second connector. The actuating portion may be depressible, or otherwise engageable, to achieve mating or unmating of the second connector to the first connector and locking or unlocking of the second connector to the suspension system component.

The first and second electrical connectors of the subject assembly may further include polarizing means for ensuring proper alignment of the first and second connectors during mating. The polarizing means may further be configured to guide the second connector into a proper alignment relative to the first connector to facilitate blind mating of the connectors. The first and/or second connector may further include appropriate seal means for environmentally sealing the connector assembly. The combination of the seal means and the insert molding of the terminals provides exceptional environmental sealing without the need for resorting to separate elastomeric boots or such structures. Additionally, the insert molding and the above described use of the metallic spring retention means provides for a rugged electrical connector assembly that can readily withstand the rigors associated with the vehicular environment in which the suspension system components are disposed.

DETAILED DESCRIPTION OF THE PREFERRED EMBODIMENT

Figure 1:
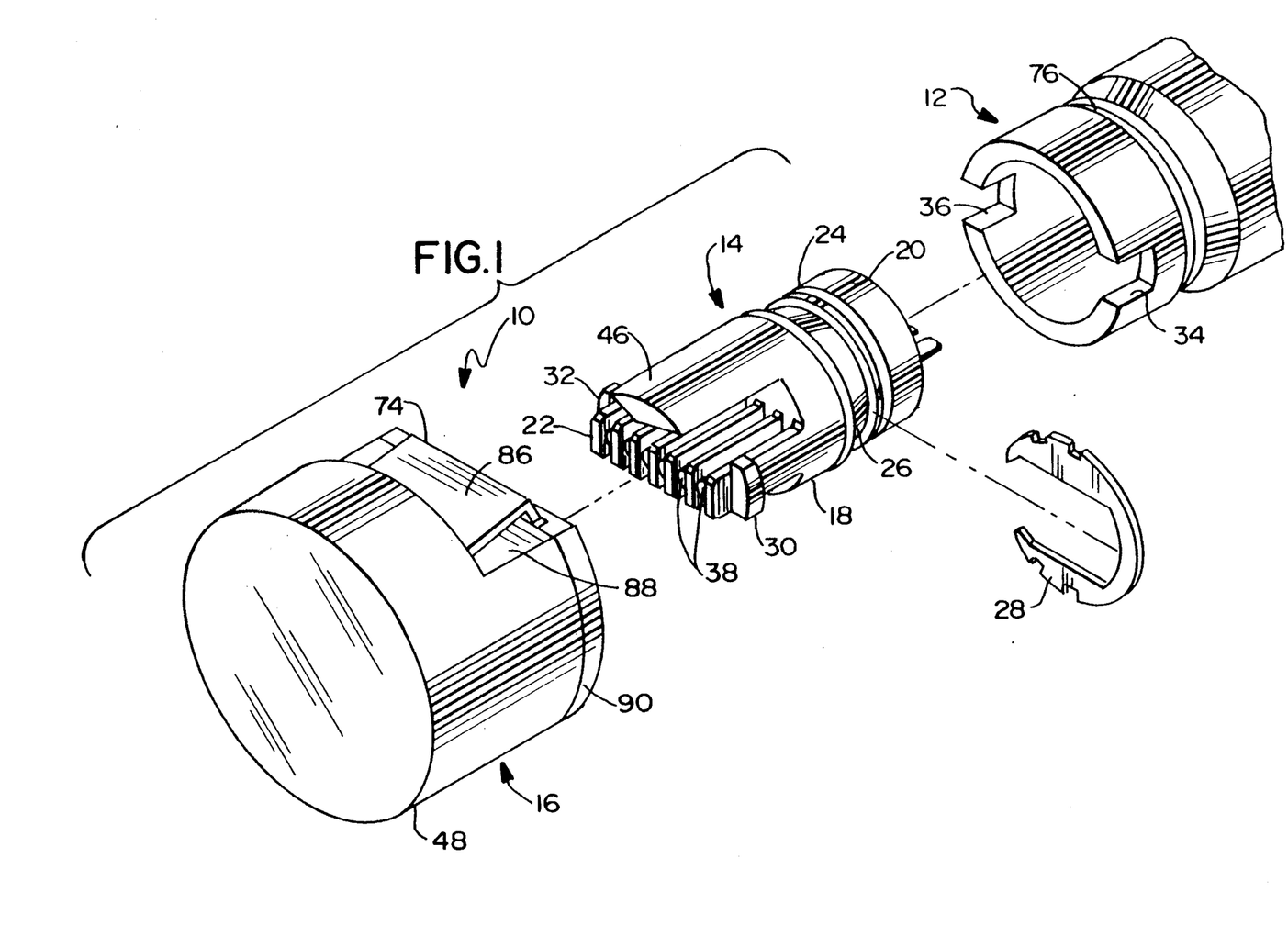
FIG. 1 is an exploded perspective view of an electrical connector assembly in accordance with the subject invention.

The electrical connector assembly of the subject invention is identified generally by the numeral 10 in FIG. 1. The electrical connector assembly 10 is specifically adapted for use with a vehicular suspension system component 12, which may be a strut or shock absorber. The suspension system component 12 is a generally cylindrical structure having a plurality of members that move relative to one another in response to roadway surface conditions to dampen vibrations that are transmitted to the vehicle. The suspension system component 12 includes electrical control means (not shown) for altering the responsiveness of the component 12 to roadway conditions and/or electrical sensors for sensing roadway conditions. The electrical connector assembly 10 of the subject invention will be operatively connected to the electrical controls and/or sensors in the suspension system component 12 to transmit signals to or from a control means located elsewhere in the vehicle. As noted above, the control means may include driver actuated controls in the passenger compartment of the vehicle and/or a microprocessor that adjusts the responsiveness of the suspension system component in accordance with sensed roadway conditions.

The electrical connector assembly 10 of the subject invention comprises a male connector 14 and a female connector 16. The male connector 14 includes a molded nonconductive plastic housing 18 having a mounting end 20 and an opposed mating end 22. The mounting end 20 of the housing 18 is dimensioned to be slidably inserted into the end of the suspension system component 12. The housing 18 of the male connector 14 is further characterized by a generally annular groove 24 formed in an exterior surface region thereof generally adjacent the mounting end 20. The annular groove 24 is dimensioned to receive an "O" ring gland for providing environmental sealing and moisture protection to the interior of the suspension system component 12.

The exterior of the housing 18 is further provided with a generally tapered or frusto-conically configured groove 26 formed between the "O" ring groove 24 and the mating end 22 of the housing 18. The frusto-conically configured groove 26 is oriented such that the smaller end is disposed closer to the mounting end 20 of the housing 18. The frusto-conically configured groove 26 in the housing 18 is dimensioned to receive a deflectable locking member 28 which may be a partly circular disc or a beveled washer. The locking member 28 is dimensioned to be received in the frusto-conically configured groove 26, and is dimensioned to readily deflect upon insertion of the mounting end 20 of the housing 18 into the suspension system component 12. The locking member 28 may include a discontinuous outer periphery to facilitate deflection. However, upon such deflection, the periphery locking member 28 will define a biting edge which will lockingly retain the male connector 14 in the suspension system component 12, thereby preventing damage to electrical connections with conductors disposed in the suspension system component 12.

Figure 4:
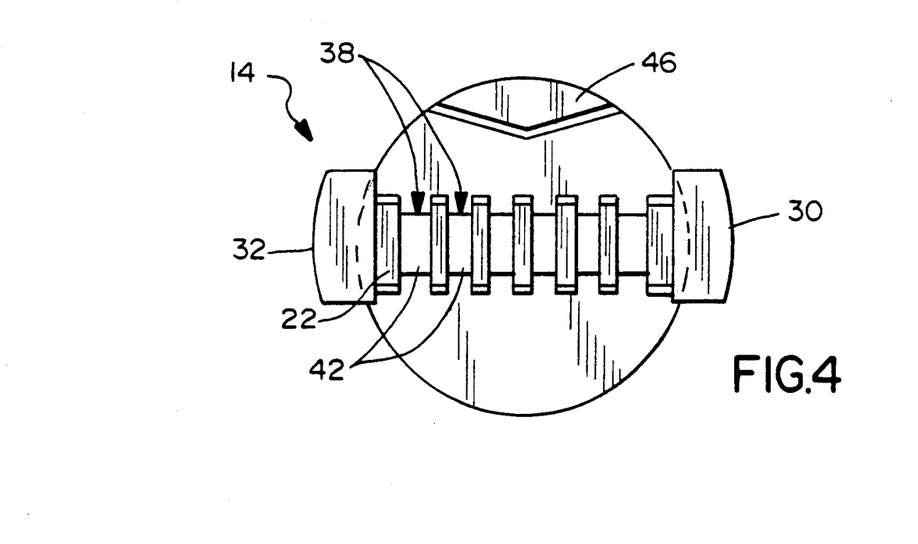
FIG. 4 is an end elevational view of the electrical connector shown in FIGS. 2 and 3.
Figure 5:
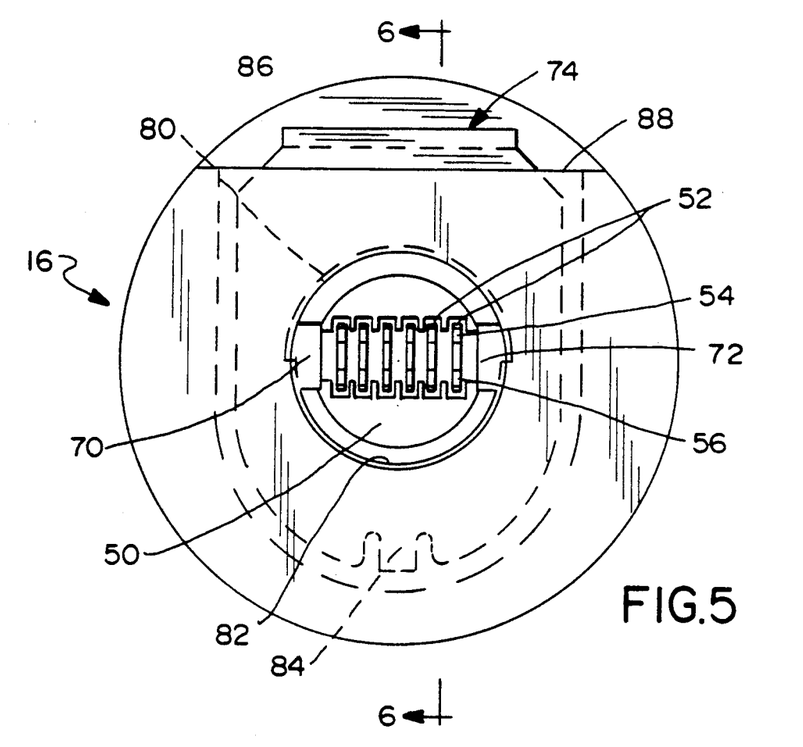
FIG. 5 is an end elevational view of the second electrical connector of the subject assembly.

The housing 18 of the male connector 14 is further provided with polarization and anti-rotation lugs 30 and 32 which are nondiametrically disposed on the housing 18 and which are respectively engaged with correspondingly disposed and dimensioned notches 34 and 36 in the suspension system component 12. The nondiametrical disposition of the lugs 30 and 32, as shown most clearly in FIG. 4, ensures polarized alignment of the male connector 14 into the end of the suspension system component 12. Additionally, the lugs 30 and 32 are sufficiently large to provide anti-rotational resistance to forces that may be exerted on the connector assembly 10 either during initial installation of the suspension system component 12 onto the vehicle or during any subsequent maintenance that may be performed on the vehicle in the vicinity of the suspension system component 12.

Figure 2:
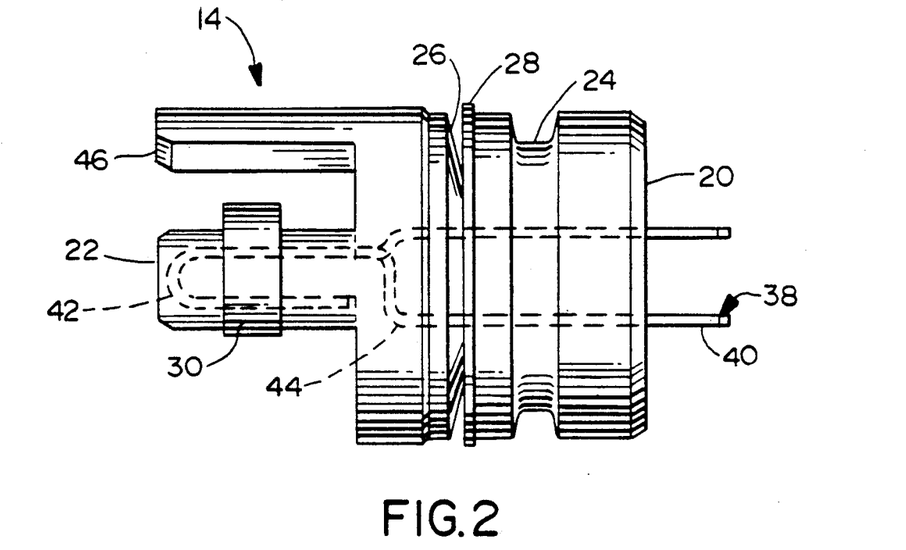
FIG. 2 is a side elevational view of a first electrical connector of the subject invention.
Figure 3:
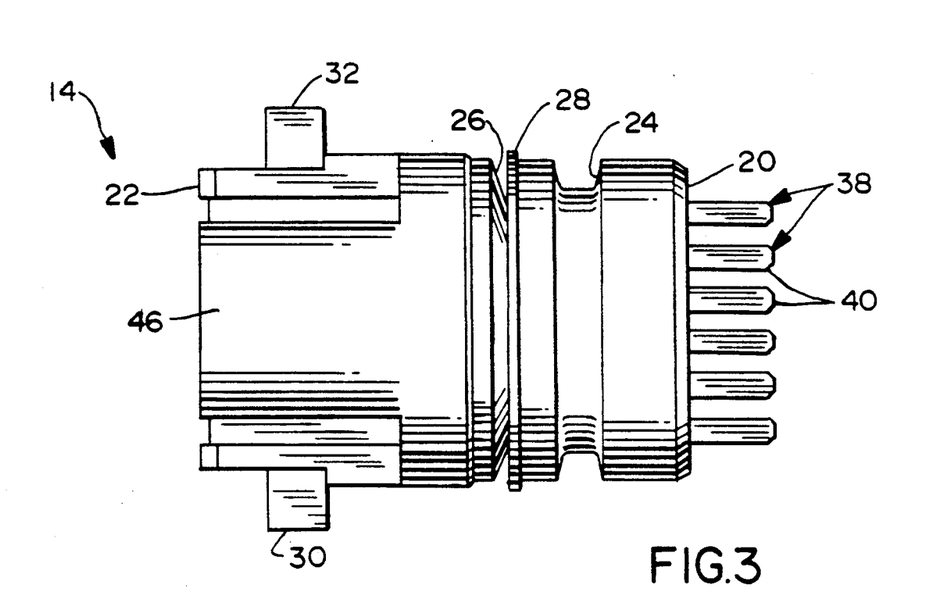
FIG. 3 is a top plan view of the electrical connector shown in FIG. 2.

The male connector 14 further includes a plurality of terminals 38 which are inserted molded into the housing 18 such that the plastic material of the housing 18 defines a unitary matrix of nonconductive materials surrounding and supporting at least portions of each terminal 38. More particularly, as shown most clearly in FIG. 2, each terminal 38 includes a wire mounting portion 40 extending from the mounting end 20 of the housing 18 for soldered or other appropriate electrical connection to a conductor leading from the electrical control means or electrical sensor means (not shown) disposed within the suspension system component 12. Each terminal 38 further includes a mating end 42 which is disposed generally adjacent the mating end 22 of the housing 18. The mating end 42 of each terminal 38 is exposed for appropriate electrical connection to a terminal mounted in the female connector 16 as explained further herein. The mating end 42 of each terminal 38 is of generally U-shaped configuration, as shown in FIG. 2. The mating end 42 preferably is bent into the illustrated U-shaped configuration subsequent to the insert molding of the terminals 38 into the housing 18. More particularly, each mating end 42 is bent over a generally arcuate molded portion of the housing 18 to define a dimensionally controlled terminal for ensuring uniform contact forces upon mating with a tuning fork terminal in the female connector 16 as explained herein. Each terminal 38 further includes an intermediate portion 44 defining the portion of the terminal 38 that is insert molded into the housing 18 of the male connector 14. The intermediate portion 44 is rigidly and precisely positioned and is surrounded by a unitary matrix of the molded nonconductive material of the housing 18.

The male connector 14 further includes a mating guide 46 unitarily formed as part of the housing 18. The guide 46 contributes to polarization of the male and female connectors 14 and 16 of the assembly 10, and further facilitates blind mating by guiding the female connector 16 into mated condition with the male connector 14.

Figure 6:
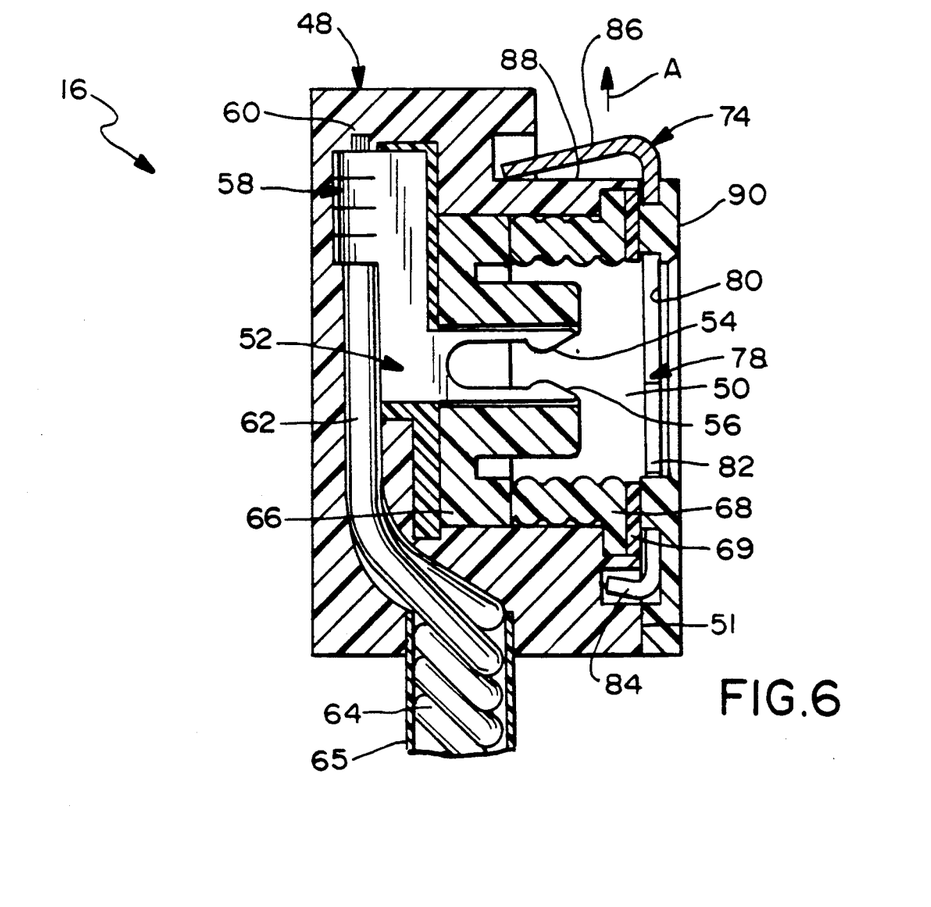
FIG. 6 is a cross-sectional view taken along line 6—6 of FIG. 5.

The female connector 16 includes a generally cylindrical nonconductive housing 48 having a cavity 50 extending into the mating end 51 of the housing 48, as shown in FIG. 6. The cavity 50 is dimensioned to receive the mating end 22 of the male connector 14. The housing 48 includes a plurality of tuning fork terminals 52 having a pair of contact beams 54 and 56 which extend into the cavity 50 and are disposed in spaced relationship to one another for biasingly engaging the generally U-shaped mating end 42 of the terminals 38 in the male connector 14. Each tuning fork terminal 52 further includes a mounting end 58 for crimped engagement to the conductor 60 of a wire lead 62. The wire lead 62 is one of a plurality of wire leads in a multi-conductor cable 64 having a PVC jacket 65 thereabout. Each terminal 52 is securely engaged in a positioning member 66 which is molded from a nonconductive material. The positioning member 66, the terminals 52, portions of the conductors 62 mated to the terminals 52 and a portion of the PVC jacket 65 all are insert molded into the housing 48 of the female connector 16. As noted above, the insert molding defines a unitary matrix of nonconductive material which surrounds and supports the terminals 52 and the respective connections of the terminals 52 to the cable 64. Thus, the insert molding provides exceptional strain relief, prevention of damage to the fragile connections between the terminals 52 and the wire lead 62 and effective environmental sealing at the interface of the cable 64, the housing 48 and the terminals 52.

The cavity 50 of the female connector 16 further is characterized by the provision of a seal 68 lockingly retained therein by a seal retention disc 69 for ensuring environmental sealing between the female connector 16 and the suspension system component 12 over which the female connector 16 is engaged. The cavity 50 of the female connector 16 also is characterized by internal lugs 70 and 72 which align with the lugs 30 and 32 on the male connector 14 and engage in the notches 34 and 36 of the suspension system component 12 for additional anti-rotational strength.

Figure 7:
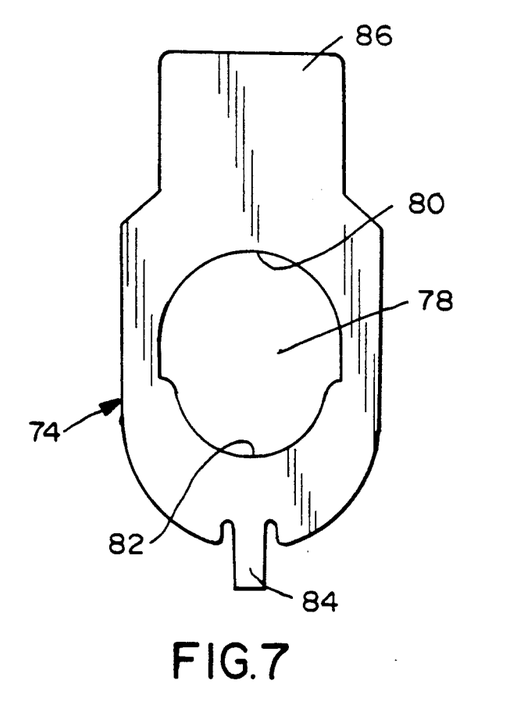
FIG. 7 is a top plan view of a blank for forming the spring lock of the subject invention.
Figure 8:
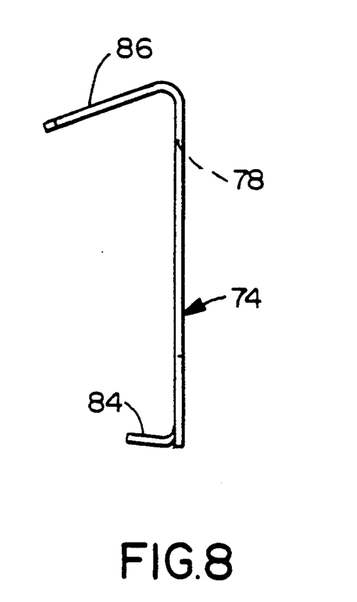
FIG. 8 is a side elevational view of the spring lock formed from the blank of FIG. 7.

The connector assembly 10 further includes a metallic spring retention clip 74 which is lockingly engageable in an annular groove 76 in the exterior of the suspension system component 12. The retention clip 74 is formed from a stamped unitary metallic blank which is shown in FIG. 7. More particularly, the retention clip 74 includes an aperture 78 having a large dimensioned portion 80 and a small dimensioned locking portion 82 for lockingly engaging the annular groove 76 formed in the exterior of the suspension system component 12. More particularly, the locking portion 82 of the aperture 78 extends through an arc of at least approximately 170° to ensure a large area of contact with the annular groove 76 of the suspension system component 12, and thereby substantially preventing accidental separation, as explained herein. The spring retention clip 74 is formed to include a positioning tab 84 and a spring biased actuating member 86. The spring retention clip 74 is positioned in the mating end 51 of the housing 48 such that the actuating member 86 thereof is disposed against a planar exterior undercut surface 88 of the housing 48. More particularly, the actuating member 86 is operative to urge the spring retention clip 74 in the direction indicated by arrow "A" in FIG. 6 which causes the small diameter locking portion 82 thereof to be urged at least partly into the cavity 50 of the housing 48. However, a force exerted on the actuating member 86 in a direction opposite to the direction indicated by arrow "A" will cause the spring retention clip 74 to deflect about the actuating member 86 to urge the small dimension locking portion 82 out of the cavity 50 of the housing 48.

The spring retention clip 74 is retained adjacent the mating end 51 of the housing 48 by a retention lever cap 90 which may be sonically sealed to the mating end 51 of the housing 48. The cap 90 simultaneously holds the seal retention disc 69 against the seal 68, for retaining the seal 68 within the cavity 50 in the housing 48 and performs a guiding and mounting function for the spring retention clip 74.

The electrical connector assembly 10 is employed by soldering or otherwise mounting the conductors (not shown) of the suspension system component 12 to the mounting ends 40 of the terminals 38 insert molded into the male connector 14. The male connector 14 is then urged into the end of the suspension system component 12. This insertion will cause the locking member 28 to deform and prevent withdrawal of the male connector 14 from the suspension system component 12. Upon complete insertion, the lugs 30 and 32 of the male connector 14 will be engaged in the corresponding notches 34 and 36 of the suspension system component 12. The nondiametrical alignment of the lugs 30 and 32 ensures proper polarization of the male connector 14 in the suspension system component 12. Additionally, the engagement of the lugs 30 and 32 in the notches 34 and 36 of the suspension system component 12 positively prevents rotation of the electrical connector assembly 10 after installation on the vehicle. As noted above, such rotation could cause damage to the electrical connections within the suspension system component 12. The mounting of the male connector 14 in the suspension system component 12 will align the mating end 22 of the male connector 14 approximately with the end of the suspension system component 12.

The female connector 16 may then be electrically connected to the male connector 14 and mechanically connected to the suspension system component 12. This electrical and mechanical connection is achieved by merely urging the female connector 16 over the end of the suspension system component 12 until locking engagement of the spring retention clip 74 with the annular groove 76 in the suspension system component 12 is achieved. This initial locking retention can be achieved by the mere axial pushing of the female connector 16 over the suspension system component 12. The displacement of the spring retention clip 74 required for locking engagement can be achieved by appropriately ramped or tapered surfaces on both the spring retention clip 74 and the end of the suspension system component 12. Thus, ramping forces generated by axial movement of the female connector 16 can cause the deflection of the spring retention clip 74 to enable the complete axial advancement of the female connector 16 over the suspension system component 12 and subsequent locking engagement of the small dimension locking portion 82 of the spring retention clip 74 in the annular groove 76 of the suspension system component 12. Alternatively, the actuating member 86 of the spring retention clip 74 may be depressed by a thumb or forefinger to enable sufficient movement of the lacking portion 82 to enable advancement of the female connector 16 over the suspension system component 12. Proper alignment and polarization of the female connector and the male connector is achieved by both the guide 46 of the male connector 14 and by the lugs 70 and 72 in the cavity 50 of the female connector housing 48. In the fully seated condition, the tuning fork contact beams 54 and 56 of the terminals 52 will engage opposed sides of the U-shaped mating ends of the terminals 38 in the male connector 14. Additionally, in the fully seated condition, the anti-rotation lugs 30 and 32 of the male connector 40 and the anti-rotation lugs 70 and 72 of the female connector 16 will prevent rotation of the connector assembly 10 in the suspension system component 12 to avoid damage to electrical connections therein. Furthermore, in the fully seated condition of the female connector 16, the small diameter locking portion 82 of the retention clip 74 will engage the annular groove 76 in the suspension system component 12 through an arc of approximately 170°. This will ensure high locking forces which positively prevent accidental separation of the female connector 16 from the suspension system component 12 and the male connector 14 disposed therein.

In summary, an electrical connector assembly is provided for a suspension system component. The electrical connector assembly includes a male connector that is lockingly and nonrotatably mounted in the end of the suspension system component. The terminals of the male connector assembly are insert molded therein and include generally U-shaped contacts at the mating end thereof for achieving high quality redundant electrical contact with a female connector of the assembly. The female connector also includes terminals insert molded therein to ensure accurate alignment, protection, strain relief and environmental sealing. The female connector is lockingly engageable over the end of the suspension system component by a metallic spring retention clip that engages an annular groove through an arc sufficiently large to ensure high locking forces. However, forces exerted on an actuating portion of the retention clip enable relatively easy intentional separation of the female connector from the suspension system component.

While the invention has been described with respect to preferred embodiment, it is apparent that various changes can be made without departing from the scope of the invention as defined by the appended claims. For example, terminals of configurations different from those illustrated herein may be employed in accordance with specific needs of a particular suspension system. Furthermore, other or additional polarization means and other locking means of the male terminal in the suspension system component may be employed.

We claim:

1. An electrical connector assembly for a vehicular suspension system component employed in a high vibration environment, said suspension system component including an open ended tip, electrical control means associated with said component for controlling selected operations of the suspension system component, the electrical connector assembly having a first connector with first terminals disposed in a first housing mounted adjacent the tip of the suspension system component and being operatively connected to the electrical control means and a second connector with second terminals disposed in a second housing mated with the first connector, wherein the improvement comprises:

portions of each said first terminal being insert molded into said first housing, such that said first housing defines a unitary matrix of nonconductive material surrounding, engaging and supporting portions of each said first terminal, said first housing includes an outer peripheral surface having n inwardly directed annular groove therein, a deflectable washer being seated in the groove of said first housing and securely engaging the suspension system component in the open ended tip for retaining the first housing therein, each said first terminal including a mounting end extending from the portion thereof insert molded in the first housing and into the suspension system component for electrical connection with the electrical control means therein and a mating end extending from the portion thereof insert molded in the first housing bent over a supporting portion of said first housing and generally toward the open ended tip of the suspension system component;

portions of each said second terminal being insert molded into said second housing such that second housing defines a unitary matrix of nonconductive material surrounding, supporting and engaging said portions of each said second terminal, said second housing being lockingly but releasably engageable over the exterior of the tip of said suspension system component, with a mating end of each said second terminal extending toward the open ended tip of said suspension system component for releasably electrically contacting a corresponding one of the first terminals of said first connector, whereby the insert molding of the first and second terminals in the respective first and second connectors achieves environmental sealing and accurate positioning of the terminals in the high vibration environment of said suspension system component.

2. An electrical connector assembly as in claim 1 further comprising selectively releasable retention means for securely but releasably engaging the second connector to an external portion of the tip of said suspension system component.

3. An electrical connector assembly as in claim 1 wherein the washer includes a discontinuous outer peripheral surface.

4. An electrical connector assembly as in claim 1 further comprising a cable having a plurality of conductors therein, end portions of the conductors being connected respectively to the second terminals and being insert molded in the second housing.

5. An electrical connector assembly as in claim 1 wherein said tip of said suspension system component comprises a pair of notches, the housing of the first connector comprising a pair of mounting lugs dimensioned and disposed for engagement with the notches of the suspension system component for preventing rotation of the electrical connector assembly relative to the suspension system component.

6. An electrical connector assembly as in claim 5 wherein the notches and the lugs are nondiametrically disposed for ensuring polarized mounting of the first connector in the suspension system component.

7. An electrical connector assembly as in claim 6 wherein the second connector further includes lugs for engaging the notches and preventing rotation of the second connector.

8. An electrical connector assembly as in claim 1 wherein the suspension system component includes an annular groove in an outer peripheral surface thereof in proximity to the tip, said assembly further comprising a resilient spring retention clip slidably mounted in the second housing for biasingly engaging the groove of the suspension system component, said spring retention clip being selectively disengageable from the groove of the suspension system component for enabling selective separation of the second connector from the suspension system component and from the first connector securely retained therein.

9. An electrical connector assembly as in claim 8 wherein the retention clip includes an aperture extending therethrough, the aperture including a large dimension portion for slidably passing over the suspension system component and a small dimension portion for locking engagement with the groove of the suspension system component.

10. An electrical connector assembly as in claim 9 wherein the small dimension portion of the aperture in the retention clip engages the annular groove of the suspension system component through an arc of approximately 170°.

11. An electrical connector assembly as in claim 9 wherein the retention clip further includes a resilient actuating member biasingly engaging the second housing and urging the small dimension portion of the retention clip into releasable locking engagement with the annular groove of the suspension system component.

12. An electrical connector assembly for a vehicular suspension system component employed in a high vibration environment, said suspension system component including an open ended tip, electrical control means associated with said component for controlling selected operations of the suspension system component, the electrical connector assembly having a first connector with first terminals disposed in a first housing mounted adjacent the tip of the suspension system component and being operatively connected to the electrical control means and a second connector with second terminals disposed in a second housing mated with the first connector, wherein the improvement comprises:

a generally annular groove being formed in an outer peripheral surface of the suspension system component in proximity to the tip of said component;

said second housing including a cavity dimensioned to receive the tip of the suspension system component, the second terminals being disposed within the cavity of said second housing; and a resilient spring retention clip slidably mounted in the second housing for biasingly engaging the groove of the suspension system component, said spring retention clip being selectively disengageable from the groove of the suspension system component for enabling selective separation of the second connector from the suspension system component and from the first connector securely retained therein.

13. An electrical connector assembly as in claim 12 wherein the retention clip includes an aperture extending therethrough, the aperture including a large dimension portion for slidably passing over the suspension system component and a small dimension portion for locking engagement with the groove of the suspension system component.

14. An electrical connector assembly as in claim 13 wherein the small dimension portion of the aperture in the retention clip engages the annular groove of the suspension system component through an arc of approximately 170°.

15. An electrical connector assembly as in claim 13 wherein the retention clip further includes a resilient actuating member biasingly engaging the second housing and urging the small dimension portion of the retention clip into releasable locking engagement with the annular groove of the suspension system component.

16. An electrical connector assembly for a vehicular suspension system component employed in a high vibration environment, said suspension system component including an open ended tip, electrical control means associated with said component for controlling selected operations of the suspension system component, the electrical connector assembly having a first connector with first terminals disposed in a first housing mounted adjacent the tip of the suspension system component and being operatively connected to the electrical control means and a second connector with second terminals disposed in a second housing mated with the first connector, wherein the improvement comprises:

a notch formed in the tip of the suspension system component; and the housings of the first and second connectors each comprising a mounting lug dimensioned and disposed for engagement with the notch in the tip of the suspension system component for preventing rotation of the electrical connector assembly relative to the suspension system component and for ensuring proper polarization of the second connector relative to the first connector.

17. An electrical connector assembly as in claim 16 wherein the tip of the suspension system component is provided with a pair of notches nondiametrically disposed thereon, and wherein the first and second connector housings each comprise a pair of mounting lugs dimensioned and disposed for engagement with the notches of the suspension system component.

* * * * *